No. 727,253. PATENTED MAY 5, 1903.
J. B. ALLEN.
DEVICE FOR HOLDING LANTERNS.
APPLICATION FILED FEB. 3, 1903.
NO MODEL.
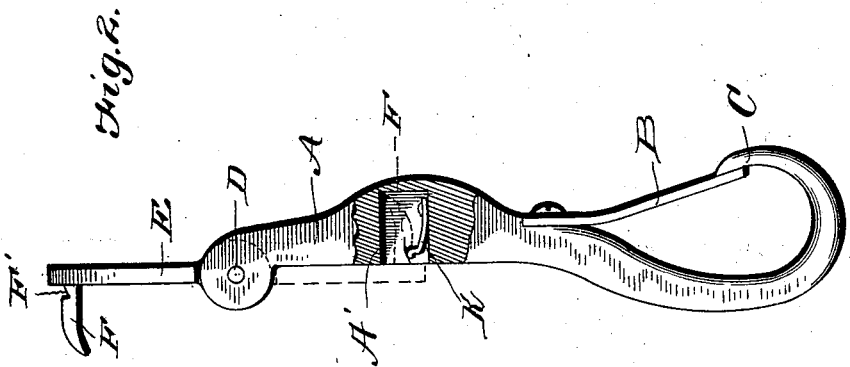
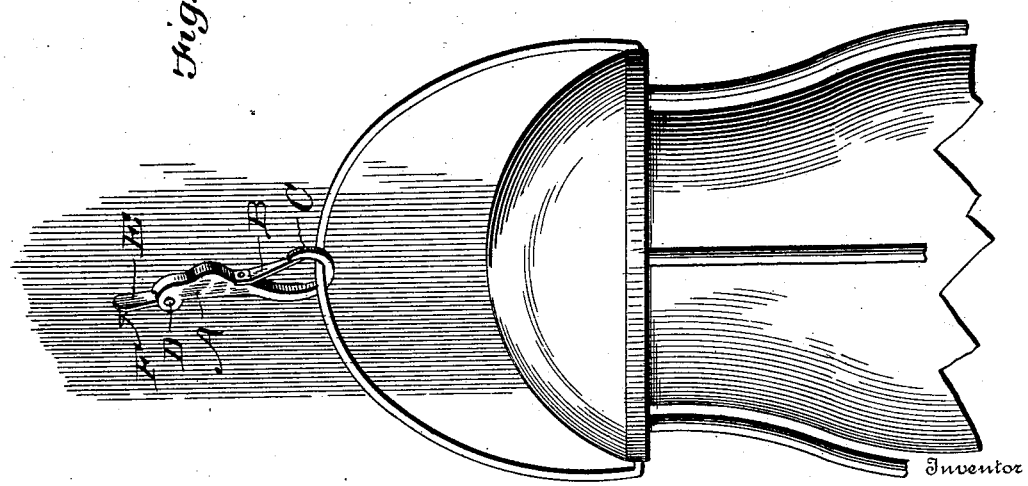

No. 727,253. Patented May 5, 1903.

UNITED STATES PATENT OFFICE.

JOHN BURD ALLEN, OF HAINSBURG, NEW JERSEY.

DEVICE FOR HOLDING LANTERNS.

SPECIFICATION forming part of Letters Patent No. 727,253, dated May 5, 1903.

Application filed February 3, 1903. Serial No. 141,730. (No model.)

*To all whom it may concern:*

Be it known that I, JOHN BURD ALLEN, a citizen of the United States, residing at Hainsburg, in the county of Warren and State of New Jersey, have invented certain new and useful Improvements in Devices for Holding Lanterns, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in lantern-holders; and it consists in the provision of a snap-hook or other suitable catch adapted to engage the bail of the lantern and having pivoted to its shank portion a link having a spur at its end which is adapted to be driven into a wall, board, or other article for the purpose of supporting the lantern-holder, making the device adapted for attachment upon various objects to hold the lantern where desired, the link carrying the spur being so mounted that when not in use it may be swung upon its pivot, so that the spur will engage an aperture in the shank portion of the holder.

My invention consists, further, in various other features, which will be hereinafter fully described and then specifically defined in the appended claims.

I illustrate my invention in the accompanying drawings, which, with the letters of reference marked thereon, form a part of this application, and in which drawings—

Figure 1 is a view showing my device as driven into a wall and holding the lantern. Fig. 2 is an enlarged detail view of the device opened ready for attachment to the wall or other object.

Reference now being had to the details of the drawings by letter, A designates the shank portion of a hook or other catch, which has in the present instance a spring-tongue B, fastened to said shank portion and its free end held yieldingly against the hook C. The other end of the shank portion is bifurcated and carries in the walls thereof a pin D, on which the apertured end of the link E is pivotally mounted. Said link E has projecting at a location adjacent to its free end a spur F, which may be either integral with or secured to said link and is adapted to be pushed or driven into the side of a wall, tree, board, or other object for the purpose of supporting the lantern-holder at any convenient location and may be easily withdrawn and the spur folded, as shown in the drawings. I have shown in the drawings the spur as notched, as at F', and adapted to engage the free end of a spring K, which is fastened at one end to the wall of the aperture A', formed in the shank portion of the hook, and when the hook is in closed relation said spring is designed to engage said notch and retain the link and spur in closed relation.

From the foregoing it will be observed that by the provision of a device embodying the features of my invention a lantern-holder is produced which is simple in construction, which may be easily attached to any support, and when not in use the link carrying the spur may be swung into a closed position and the device may be carried in the pocket of garments.

While I have shown a particular detailed construction embodying the features of my invention, it will be understood that I may make alterations in the construction of the same without departing from the spirit of the invention.

Having thus fully described my invention, what I claim as new, and desire to secure by Letters Patent, is—

1. A lantern-holder comprising a hook adapted for attachment to the lantern, a link pivoted to the shank portion of the hook, and a spur carried by said link, and means for locking the link against said shank portion and the spur in an aperture in the latter, as set forth.

2. A lantern-holder comprising a hook, a link pivoted to the shank portion thereof, a spur carried by said link, the latter adapted to turn upon its pivot so that the spur will close in an aperture in the shank portion of said hook, as set forth.

3. A lantern-holder comprising a hook, a link pivoted thereto, a spur on said link having a notch therein, a spring secured to the wall of an aperture in the shank portion of the hook and designed to engage said notch and hold the spur and link in a closed relation, as set forth.

In testimony whereof I hereunto affix my signature in presence of two witnesses.

JOHN BURD ALLEN.

Witnesses:
M. S. ANDERSON,
J. E. ALLEN.